United States Patent [19]
Henderson

[11] Patent Number: 5,351,031
[45] Date of Patent: Sep. 27, 1994

[54] NON-LINEAR SLEW RATE LIMITER

[75] Inventor: Michael J. Henderson, Grass Valley, Calif.

[73] Assignee: The Grass Valley, Group, Inc., Nevada City, Calif.

[21] Appl. No.: 17,928

[22] Filed: Feb. 16, 1993

[51] Int. Cl.$^5$ .............................................. G06F 7/02
[52] U.S. Cl. ................................................ 340/146.2
[58] Field of Search ..................................... 340/146.2

[56] References Cited

U.S. PATENT DOCUMENTS 4,432,009 2/1984 Reitmeier et al. .................. 358/22

Primary Examiner—Margaret Rose Wambach
Attorney, Agent, or Firm—Francis I. Gray

[57] ABSTRACT

A non-linear slew rate limiter for a digital signal compares the digital signal with a reference waveform that has a frequency spectrum that slightly exceeds the passband of a reconstruction filter within a digital to analog converter. Samples of the digital signal are compared with immediately prior samples of an output digital signal to determine the polarity of the slewing of the digital signal, and also are compared with corresponding next samples of the reference waveform to determine whether the slew rate of the digital signal exceeds the slew rate of the reference waveform. If the slew rate of the digital signal exceeds the slew rate of the reference waveform, the sample of the reference waveform replaces the corresponding sample of the digital signal in the output digital signal. Otherwise the sample of the digital signal becomes the output digital signal.

7 Claims, 1 Drawing Sheet

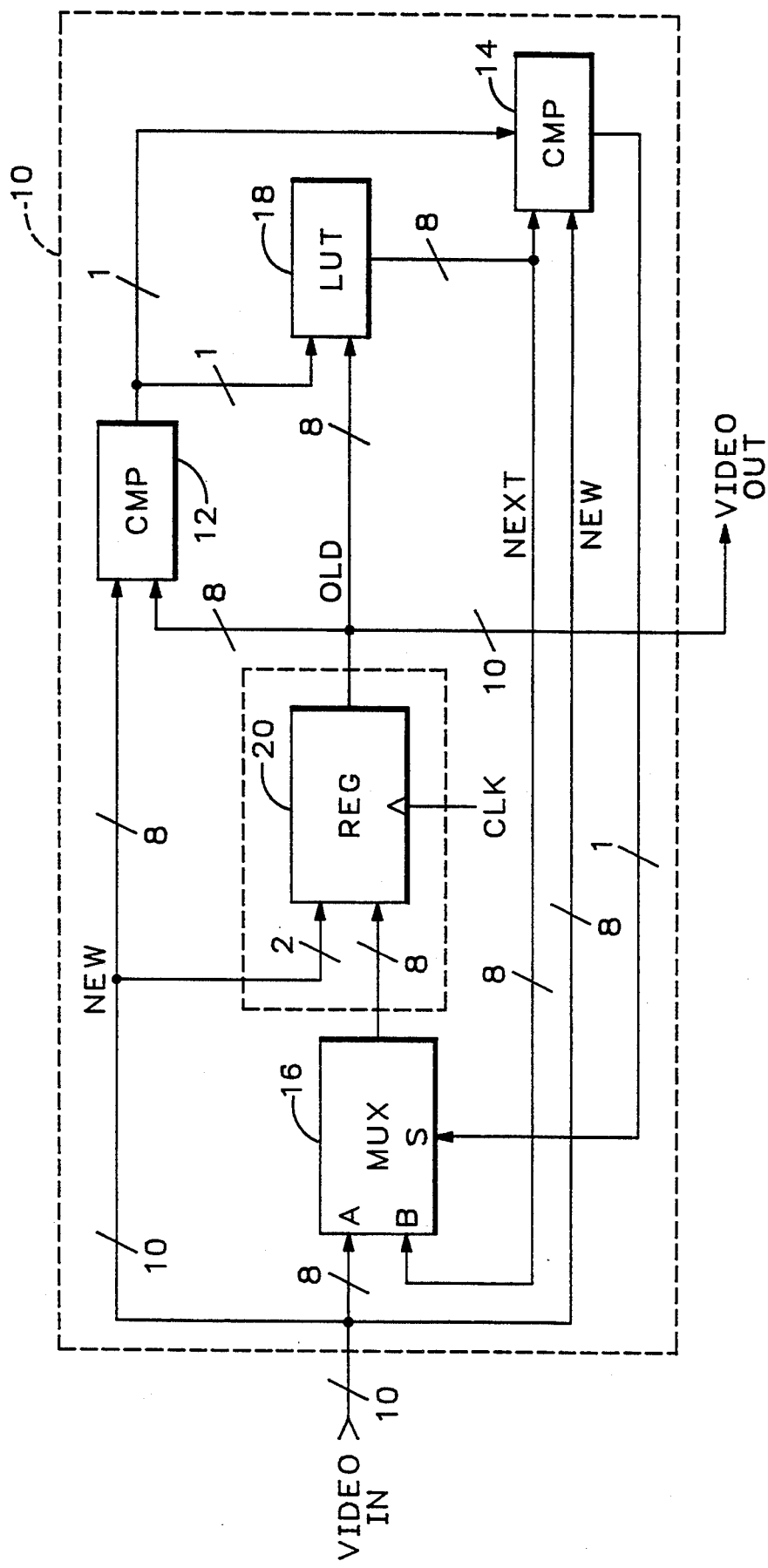

NON-LINEAR SLEW RATE LIMITER

BACKGROUND OF THE INVENTION

The present invention relates to slew rate limiters, and more particularly to a non-linear slew rate limiter for digital video signals that minimizes "ghost" images when such signals are converted to analog signals for display on a video monitor.

When digitized analog video signals are processed in the digital domain, the resulting signals often contain frequency components that are above the "Nyquist frequency limit" of one-half the sample rate. When such signals are converted back into the analog domain, the required reconstruction filter may produce large amplitude damped oscillations in the time domain in the vicinity of "forbidden" high transition rate, or slew, signals. If the resulting signals are video signals which are viewed on a video monitor, faint "ghost" images are seen to the left or right of objects that contrast sharply with their backgrounds. This phenomenon is considered undesirable, but unavoidable given the nature of the specified reconstruction filters.

What is desired is a non-linear slew rate limiter for digital signals that minimizes "ghost" images that result from high transition rates in digital video signals.

SUMMARY OF THE INVENTION

Accordingly the present invention provides a non-linear slew rate limiter for a digital signal that modifies the digital signal after it has passed through preexisting digital signal processing equipment but before conversion back to an analog signal. The transition rate of the digital signal is limited to that of a reference waveform, the frequency spectrum of which just barely exceeds the desired passband of a reconstruction filter for a digital to analog converter. The transition rate is limited by comparing the present time sample of the digital signal with the most recent previous time sample of the output digital signal and with the corresponding time sample of the reference waveform. If the digital signal is slewing more quickly than the reference waveform, the reference waveform sample is substituted for that of the digital signal for the present sample time in the output digital signal. The substituted value then is used for the most recent previous time sample of the output digital signal for the purpose of comparison with the next present time sample of the digital signal. The resulting output digital signal is identical to that of the digital signal as long as the digital signal contains no energy at frequencies above the passband of the reconstruction filter. If the digital signal has a slew rate greater than that of the reference waveform starting from the same point, the slew rate of the digital signal is limited to that of the reference waveform to provide reduced "ringing" in the reconstruction filter.

The objects, advantages and other novel features of the present invention are apparent from the following detailed description when read in conjunction with the appended claims and attached drawing.

BRIEF DESCRIPTION OF THE DRAWING

The FIGURE is a block diagram of a non-linear slew rate limiter according to the present invention.

DESCRIPTION OF THE PREFERRED EMBODIMENT

Referring now to the FIGURE an input digital signal, such as a ten-bit video signal, is input to a PROM 10, such as a Cypress Semiconductor CY7B201 Reprogrammable Power-Down PROM or the like. Since the commercial components generally process eight-bit data, only the eight most significant bits (MSB) of the input digital signal are input to the PROM 10. The two least significant bits (LSB) of the input digital signal are input to a register 20 together with an eight-bit digital output from the PROM 10. An output digital signal from the register 20, which includes the eight-bit output from the PROM 10 and the two LSBs from the input digital signal, is input to a digital to analog converter (not shown) for conversion back to the analog domain. The eight MSBs of the output digital signal also are input to the PROM 10. The register 20 is clocked by a sample clock, such as the pixel clock for a digital video signal.

The eight MSBs of the input digital signal are input to first and second comparators 12, 14 and to one input of a multiplexer 16. The first comparator 12 compares the new sample of the input digital signal with the immediately prior sample of the output digital signal to determine the direction of the transition between the two samples. The output of the first comparator 12 is a single bit that has one state when the transition is positive and the other state when the transition is negative. The output from the first comparator 12 is input as a polarity signal to the second comparator 14 and as one bit of an address into a look-up table 18 that contains the digital representation of a reference waveform which has a frequency spectrum that just barely exceeds the passband of a reconstruction filter (not shown) for the digital to analog converter. The remainder of the address for the look-up table 18 is the eight MSBs of the output digital signal from the register 20. The output from the look-up table 18 is the next sample of the reference waveform that corresponds to the new sample of the input digital signal. This next sample from the look-up table 18 is input to the other input of the multiplexer 16 and to the second comparator 14 together with the new sample of the input digital signal.

The second comparator 14 provides a single bit select signal that indicates whether the new sample of the input digital signal exceeds the next sample of the reference waveform. If the bit is in one state, then the slew rate of the input digital signal does not exceed the slew rate of the reference waveform. If the bit is in the other state, then the slew rate of the input digital signal does exceed the slew rate of the reference waveform. The select signal from the second comparator 14 is input to the select input of the multiplexer 16 to select either the new sample of the input digital signal or the next sample of the reference waveform for input to the register 20 to produce the output digital signal. The two LSBs of the new sample of the input digital signal are combined with the selected eight MSBs from the multiplexer 16 by the register 20 to provide the output digital signal having the same number of bits as the input digital signal.

In operation the new sample of the input digital signal is compared with the next sample of the reference waveform as determined from the immediately previous sample of the output digital signal. If the slew rate determined by the comparison for the input digital signal is within the passband of the recirculation filter of the digital to analog converter, i.e., does not exceed the slew rate of the reference waveform, the new sample of the input digital signal is passed on to become the output digital signal. Otherwise the next sample of the reference waveform replaces the new sample of the input digital signal in the output digital signal. The reference waveform may have a slew rate that is dependent on the absolute value of the signal at which slew rate is measured. An input digital signal that slews abruptly starting from the middle of the allowed amplitude range requires less slew rate limiting than a signal that slews abruptly starting from a point near either end of the allowed amplitude range, since ringing needs to be suppressed near the limits of the amplitude range to a greater degree to avoid illegal amplitude values. One example of an appropriate reference waveform is a sinusoid whose peak to peak amplitude corresponds to the maximum amplitude range of the digital signal channel and whose frequency is slightly beyond the specified passband of the reconstruction filter used in the digital to analog converter.

Thus the present invention provides a non-linear slew rate limiter for a digital signal that compares the slew rate of the digital signal with that of a reference signal having a frequency that slightly exceeds the passband of the reconstruction filter for a digital to analog converter, replacing samples of the digital signal at the output with samples of the reference signal when the slew rate of the digital signal exceeds that of the reference signal.

What is claimed is:

1. A non-linear slew rate limiter for a digital signal comprising:
    means for comparing the slew rate of the digital signal with the slew rate of a reference waveform having a frequency spectrum determined by the passband of a reconstruction filter for a digital to analog converter; and
    means for replacing samples of the digital signal with samples of the reference waveform when the slew rate of the digital signal exceeds the slew rate of the reference waveform to produce an output digital signal.

2. The non-linear slew rate limiter as recited in claim 1 wherein the comparing means comprises:
    means responsive to the digital signal and the output digital signal for accessing the reference waveform; and
    means for generating from the digital signal and the accessed reference waveform a select signal that indicates whether the slew rate of the digital signal exceeds the slew rate of the reference waveform.

3. The non-linear slew rate limiter as recited in claim 2 wherein the accessing means comprises:
    a first comparator for generating from the digital signal and the output digital signal a polarity signal indicating the direction of the slew rate of the digital signal; and
    a look-up table containing a digital representation of the reference waveform that is addressed by the output digital signal and the polarity signal to produce the accessed reference waveform.

4. The non-linear slew rate limiter as recited in claim 3 wherein the generating means comprises a second comparator for comparing the accessed reference waveform with the digital signal as a function of the polarity signal to produce the select signal.

5. The non-linear slew rate limiter as recited in claim 2 wherein the replacing means comprises:
    means for selecting in response to the select signal between the digital signal and the accessed reference waveform to produce an output signal; and
    means for clocking the output signal to produce the output digital signal.

6. The non-linear slew rate limiter as recited in claim 5 wherein the selecting means comprises a multiplexer having the digital signal and the accessed reference waveform as inputs to produce the output as a function of the select signal.

7. The non-linear slew rate limiter as recited in claim 6 wherein the clocking means comprises a register having the output of the multiplexer as an input and having a clock input to which a sample clock for the digital signal is coupled to store the output from the multiplexer as the output digital signal at the sample clock rate.

* * * * *